US012573664B2

(12) United States Patent
Kwak et al.

(10) Patent No.: US 12,573,664 B2
(45) Date of Patent: Mar. 10, 2026

(54) ELECTROLYTE FOR A LITHIUM SECONDARY BATTERY INCLUDING AN IONIC LIQUID CONTAINING AN ETHER FUNCTIONAL GROUP AND A LITHIUM SECONDARY BATTERY INCLUDING THE SAME

(71) Applicants: HYUNDAI MOTOR COMPANY, Seoul (KR); KIA CORPORATION, Seoul (KR); University-Industry Cooperation Group of Kyung Hee University, Yongin-si (KR)

(72) Inventors: Kyu Ju Kwak, Hwaseong-si (KR); Won Keun Kim, Seoul (KR); Eun Ji Kwon, Yongin-si (KR); Samuel Seo, Yongin-si (KR); Dong Hyun Lee, Seoul (KR); Kyoung Han Ryu, Yongin-si (KR); Yeon Jong Oh, Seoul (KR); Je Seung Lee, Seoul (KR); Dae Won Kim, Seoul (KR); Su Yeon Lee, Yeongam-gun (KR)

(73) Assignees: HYUNDAI MOTOR COMPANY, Seoul (KR); KIA CORPORATION, Seoul (KR); University-Industry Cooperation Group of Kyung Hee University, Yongin-si (KR)

( * ) Notice: Subject to any disclaimer, the term of this patent is extended or adjusted under 35 U.S.C. 154(b) by 603 days.

(21) Appl. No.: 18/077,074

(22) Filed: Dec. 7, 2022

(65) Prior Publication Data

US 2023/0344009 A1 Oct. 26, 2023

(30) Foreign Application Priority Data

Apr. 20, 2022 (KR) ........................ 10-2022-0048597

(51) Int. Cl.
*H01M 10/0569* (2010.01)

(52) U.S. Cl.
CPC .................. *H01M 10/0569* (2013.01); *H01M 2300/0028* (2013.01)

(58) Field of Classification Search
None
See application file for complete search history.

(56) References Cited

U.S. PATENT DOCUMENTS 6,068,950 A 5/2000 Gan et al.
9,573,915 B2 2/2017 Lee et al.
(Continued)

FOREIGN PATENT DOCUMENTS

JP 2020138917 A * 9/2020 ............ C07F 9/5407
KR 101614017 B1 * 4/2016 .......... H01M 10/056
(Continued)

OTHER PUBLICATIONS

Abstract Translation of KR 2015-109185 A (published also as KR 101614017 B1, dated 2016) (Year: 2015).*
(Continued)

*Primary Examiner* — Kevin M Bernatz
(74) *Attorney, Agent, or Firm* — Lempia Summerfield Katz LLC

(57) ABSTRACT

Disclosed is an electrolyte for a secondary battery that includes an ionic liquid containing an ether functional group, thereby providing effects of lowering the viscosity and improving lithium ion conductivity even when a molecular weight is increased.

19 Claims, 2 Drawing Sheets

7 functional groups

(56) References Cited

U.S. PATENT DOCUMENTS

| | | | | |
|---|---|---|---|---|
| 9,991,559 | B2 | 6/2018 | Zhang et al. | |
| 10,074,874 | B2 | 9/2018 | Dubois et al. | |
| 11,105,013 | B2 | 8/2021 | Benaben et al. | |
| 2010/0121075 | A1 | 5/2010 | Nguyen et al. | |
| 2012/0073978 | A1 | 3/2012 | Malkowsky et al. | |
| 2015/0303522 | A1* | 10/2015 | Nakamoto | H01M 10/0569 429/341 |
| 2022/0263129 | A1* | 8/2022 | Lu | H01M 10/0565 |
| 2023/0318025 | A1* | 10/2023 | Kwak | H01M 50/46 |
| 2025/0070226 | A1* | 2/2025 | Kwak | H01M 10/052 |

FOREIGN PATENT DOCUMENTS

| | | |
|---|---|---|
| KR | 102127081 B1 | 6/2020 |
| KR | 102290292 B1 | 8/2021 |

OTHER PUBLICATIONS

Abstract Translation of CN 103081187 A (Year: 2013).*
Abstract Translation of JP 2020-138917 A (Year: 2020).*
Machine Translation of JP 2020-138917 A (Year: 2020).*
Machine Translation of KR101614017B (Year: 2016).*
D. Gao et al., Ethylene ethyl phosphate as a multifunctional electrolyte additive for lithium-ion batteries, RSC Advances, Jan. 23, 2015, 7pp., 10.1039/c4ra15899g.
Frederik Philippi et al., Multiple Ether-Functionalized Phosphonium Ionic Liquids as Highly Fluid Electrolytes, ChemPhysChem, Dec. 5, 2018, 13pp., 2019, 20, 443-455.
Hong Won Lee, Synthesis of Novel Ionic Liquids for Electrolytes with Unsymmetrical Bis(sulfonyl)imide Anions containing a 2-carboxyethyl functional group, School of Chemical and Biological Engineering The Graduate School Seoul National University, Feb. 2020, 76pp.
Il Jin Kim et al., Ionic Liquid Crystal Electrolytes based on Ether Functionalized Ionic Liquid for Lithium Batteries, Appl. Chem. Eng., Jun. 2020, 5pp, vol. 31, No. 3.
Jin Hong Lee et al., Facilitated Ion Transport in Smectic Ordered Ionic Liquid Crystals, Adv. Mater., Sep. 8, 2016, 7pp., 2016, 28, 9301-9307.
Luis C. Branco et al., Preparation and Characterization of New Room Temperature Ionic Liquids, Chem. Eur. J., Jan. 14, 2022, 8pp., 8, No. 16.
Qifeng Zheng et al., A cyclic phosphate-based battery electrolyte for high voltage and safe operation, Nature Energy, Mar. 20, 2020, 8pp., https://doi.org/10.1038/s41560-020-0567-z.
Seo Kyung Park et al., Evolution of Ion-Ion Interactions and Structures in Smectic Ionic Liquid Crystals, J. Phys. Chem. C, Jul. 26, 2019, 14pp., 10.1021/acs.jpcc.9b04056.
Yunxian Qian, Mechanism Study of Unsaturated Tripropargyl Phosphate as an Efficient Electrolyte Additive Forming Multifunctional Interphases in Lithium Ion and Lithium Metal Batteries, ACS Applied Materials & Interfaces, Feb. 10, 2020, 31pp., 10.1021/acsami.9b21605.
Ziqi Zeng et al., Bis(2,2,2-trifluoroethyl) methylphosphonate: An Novel Flame-retardant Additive for Safe Lithium-Ion Battery, Electrochimica Acta 129 (2014) 300-304, Feb. 26, 2014, 5pp., http://dx.doi.org/10.1016/j.electacta.2014.02.062.

* cited by examiner

No functional group 7 functional groups

ELECTROLYTE FOR A LITHIUM SECONDARY BATTERY INCLUDING AN IONIC LIQUID CONTAINING AN ETHER FUNCTIONAL GROUP AND A LITHIUM SECONDARY BATTERY INCLUDING THE SAME

CROSS-REFERENCE TO RELATED APPLICATION

This application claims under 35 U.S.C. § 119(a) the benefit of priority to Korean Patent Application No. 10-2022-0048597, filed on Apr. 20, 2022, the entire contents of which are incorporated herein by reference.

BACKGROUND

(a) Technical Field

The present disclosure relates to an electrolyte for a lithium secondary battery including an ionic liquid containing an ether functional group, and a lithium secondary battery including the electrolyte disclosed herein.

(b) Background Art

The development of electrolytes for lithium secondary batteries based on ionic liquids, which are expected to design batteries with excellent stability due to remarkably low volatility and flammability and a wide voltage range thereof, is drawing a great deal of attention. Conventional pyridinium-based and imidazolium-based ionic liquids have low reduction stability, thus being inapplicable to lithium secondary batteries. Carbonate-based organic solvent mixed electrolytes have limitations in lowering flammability, which is a disadvantage of conventional electrolytes, and have low ionic conductivity compared to viscosity. In addition, when conventional ionic liquids are applied in the form of solid-like gel electrolytes to lithium secondary batteries, a problem of high interfacial resistance between the lithium electrode and the electrolyte may occur.

The above information disclosed in this Background section is only to enhance understanding of the background of the disclosure, and therefore it may contain information that does not form the prior art that is already known to a person of ordinary skill in the art.

SUMMARY OF THE DISCLOSURE

The present disclosure provides an electrolyte for lithium secondary batteries that is capable of increasing lithium ion conduction and lowering viscosity.

It is another object of the present disclosure to provide an electrolyte for lithium secondary batteries that is capable of maintaining a liquid phase even when mixed with a lithium salt.

The objects of the present disclosure are not limited to those described above. Other objects of the present disclosure are understood from the following description and are able to be implemented by means defined in the claims and combinations thereof.

In one aspect, the present disclosure provides an electrolyte for a lithium secondary battery including an ionic liquid containing a cation and an anion, and a metal salt, wherein at least one of the cation and the anion includes an ether group.

The cation may include pyrrolidinium, piperidinium, morpholinium, ammonium, phosphonium, or combinations thereof.

The cation may include:

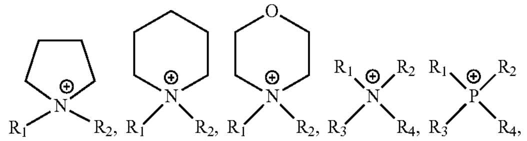

or combinations thereof, wherein $R_1$, $R_2$, $R_3$, and $R_4$ each include a substituted or unsubstituted C1-C12 alkyl group, at least one of $R_1$, $R_2$, $R_3$, and $R_4$ includes an aliphatic compound including the ether group.

The cation may include:

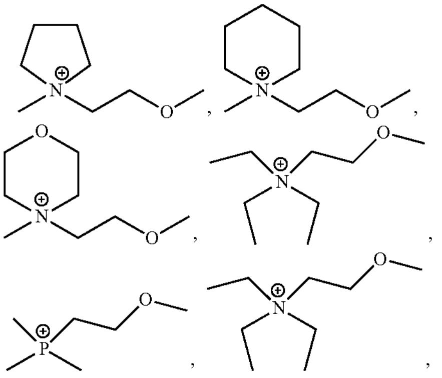

or combinations thereof.

The anion may include the ether group represented by:

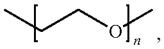, wherein n is an integer in a range of 1 to 3.

The anion may include phosphite, phosphate, sulfide, or combinations thereof.

Specifically, the anion may include:

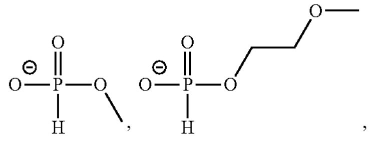

or combinations thereof.

The ionic liquid may include 1 to 7 ether groups.

A lowest unoccupied molecular orbital (LUMO) energy of the electrolyte may be higher than a lowest unoccupied molecular orbital (LUMO) energy level of lithium.

The electrolyte or ionic liquid may be in a liquid state in a temperature range of 15° C. to 25° C. when the ionic liquid has a molecular weight of 350 g/mol or less.

The metal salt may be a salt having the structure of $A^+B^-$, wherein $A^+$ includes at least one alkali metal cation, and wherein $B^-$ includes $BF_4^-$, $B(CN)_4^-$, $CH_3BF_3^-$, $C_2H_5BF_3^-$, $CF_3BF_3^-$, $C_2F_5BF_3^-$, n-$C_3H_7BF_3^-$, n-$C_4F_9BF_3^-$, $PF_6^-$, $CF_3CO_2^-$, $CF_3SO_3^-$, $N(SO_2F)_2^-$, $N(SO_2CF_3)_2^-$, $N(SO_2C_2F_5)_2^-$, $N(COCF_3)(SO_2CF_3)^-$, $N(CN)_2^-$, $C(CN)_3^-$, $SCN^-$, $SeCN^-$, $CuCl_2^-$, $AlCl_4^-$, $F(HF)_{2.3}^-$, $BOB^-$, $ODFB^-$, or combinations thereof.

A molar ratio of the ionic liquid to the metal salt may be in a range of 0.1:1 to 1:1.

In another aspect, the present disclosure provides a lithium secondary battery including a cathode, an anode including a lithium metal, and a separator interposed between the cathode and the anode, wherein the lithium secondary battery is impregnated with the electrolyte.

Other aspects and embodiments of the disclosure are discussed infra.

BRIEF DESCRIPTION OF THE DRAWINGS

The above and other features of the present disclosure are described in detail with reference to certain exemplary embodiments thereof, illustrated in the accompanying drawings which are given hereinbelow by way of illustration only, and thus are not limitative of the present disclosure.

DETAILED DESCRIPTION

Figure 1:
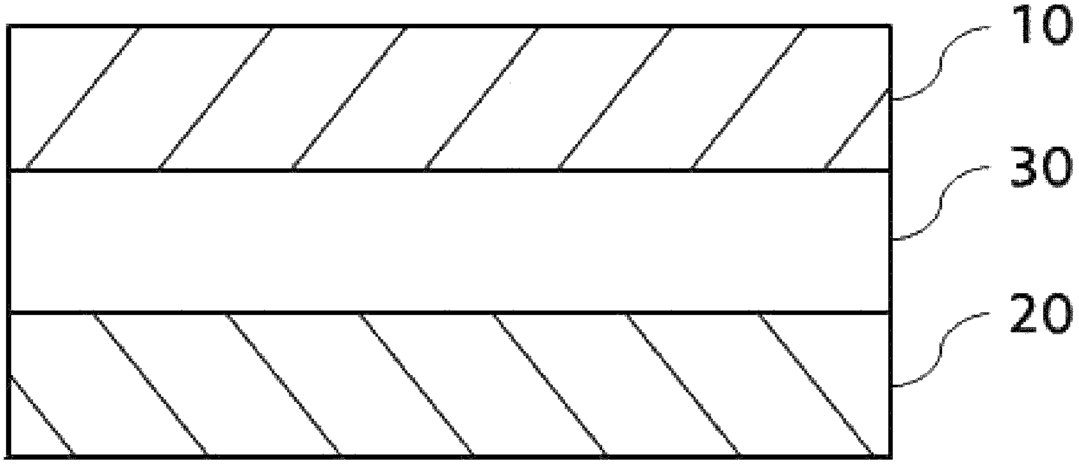
FIG. 1 shows a lithium secondary battery according to the present disclosure.

The objects described above, as well as other objects, features, and advantages, are understood from the following embodiments with reference to the attached drawings. However, the present disclosure is not limited to the embodiments and may be embodied in different forms. The embodiments are suggested only to offer a thorough and complete understanding of the disclosed context and to sufficiently inform those skilled in the art of the technical concept of the present disclosure.

Like reference numbers refer to like elements throughout the description of the figures. In the drawings, the sizes of structures may be exaggerated for clarity. Although the terms “first”, “second”, etc. may be used herein to describe various elements, these elements should not be construed as being limited by these terms, which are used only to distinguish one element from another. For example, within the scope defined by the present disclosure, a “first” element may be referred to as a “second” element, and similarly, a “second” element may be referred to as a “first” element. Singular forms are intended to include plural forms as well, unless the context clearly indicates otherwise.

The terms “comprises” and/or “has”, when used in this specification, specify the presence of stated features, integers, steps, operations, elements, components, or combinations thereof, but do not preclude the presence or addition of one or more other features, integers, steps, operations, elements, components, or combinations thereof. In addition, it will be understood that, when an element such as a layer, film, region, or substrate is referred to as being “on” another element, it can be directly on the other element, or an intervening element may also be present. Further, when an element such as a layer, film, region, or substrate is referred to as being “under” another element, it can be directly under the other element, or an intervening element may also be present.

Unless the context clearly indicates otherwise, all numbers, figures, and/or expressions that represent ingredients, reaction conditions, polymer compositions, and amounts of mixtures used in the specification are approximations that reflect various uncertainties of measurement occurring inherently in obtaining these figures, among other things. For this reason, it should be understood that, in all cases, the term “about” should be understood to modify all numbers, figures, and/or expressions. In addition, when numerical ranges are disclosed in the description, these ranges are continuous, and include all numbers from the minimum to the maximum, including the maximum within each range, unless otherwise defined. Furthermore, when the range refers to an integer, it includes all integers from the minimum to the maximum, including the maximum within the range, unless otherwise defined.

FIG. 1 is a cross-sectional view illustrating a lithium secondary battery according to the present disclosure. Referring to FIG. 1, the lithium secondary battery may include a cathode 10, an anode 20, and a separator 30 disposed between the cathode 10 and the anode 20. The lithium secondary battery may be impregnated with an electrolyte (not shown).

The cathode 10 may include a cathode active material, a binder, a conductive material, and/or the like.

The cathode active material may include lithium cobalt oxide, lithium nickel cobalt manganese oxide, lithium nickel cobalt aluminum oxide, lithium iron phosphate, lithium manganese oxide, or combinations thereof. However, the cathode active material is not limited thereto and any cathode active material available in the art may be used.

The binder is a component that assists in binding the cathode active material to the conductive material and bonding to the current collector and includes polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butadiene rubber, fluororubber, various copolymers, and/or the like.

The conductive material is not particularly limited as long as it has conductivity without causing a chemical change in the battery. Examples of the conductive material include: graphite such as natural graphite or artificial graphite; carbon-based substances such as carbon black, acetylene black, Ketjen black, channel black, furnace black, lamp black, and/or thermal black; conductive fibers such as carbon fibers and/or metal fibers; metal powders such as carbon fluoride, aluminum, and/or nickel powder; conductive whiskers such as zinc oxide and/or potassium titanate; conductive metal oxides such as titanium oxide; conductive materials such as polyphenylene derivatives and/or the like.

The anode 20 may include lithium metal or a lithium metal alloy.

The lithium metal alloy may include an alloy including lithium and a metal or metalloid capable of alloying with lithium.

The metal or metalloid capable of alloying with lithium may include: silicon (Si), tin (Sn), aluminum (Al), germanium (Ge), lead (Pb), bismuth (Bi), antimony (Sb), and/or the like.

The lithium metal has a large electric capacity per unit weight and thus is advantageous to obtain a high-capacity battery.

The separator 30 is a component configured to prevent the cathode 10 and the anode 20 from contacting each other.

The separator 30 is not particularly limited as long as it is commonly used in the technical field to which the present disclosure pertains and includes, for example, a polyolefin-based material such as polypropylene (PP), polyethylene (PE), or the like.

A vehicle battery electrolyte using lithium as an anode requires chemical resistance to lithium metal, stability to reduction reactions, sufficient lithium ion-selective ionic conductivity that can be applied to high-density cathodes, and low viscosity to maximize the ionic conductivity. The LUMO energy level of the electrolyte should be higher than the Fermi energy level of lithium metal in order to obtain low viscosity. However, an ionic liquid electrolyte has inevitably a high viscosity. Therefore, lithium ion selectivity is low due to competition with cations, causing limited lithium ion movement. For this reason, it is very important to introduce a functional group capable of selectively moving lithium. At this time, when a plurality of functional groups is introduced, an excess of lithium ions can move per unit time, a large number of lithium ions move per one competing ionic liquid cation, and thus the selective mobility of lithium ions is greatly increased. However, when a large number of functional groups is introduced into an ionic liquid having a high molecular weight, the effect is not obtained due to the high viscosity of the ionic liquid. For this reason, it is the most important to introduce functional groups into an ionic liquid having a minimum molecular weight.

The electrolyte for lithium secondary batteries according to the present disclosure includes an ionic liquid containing a cation and an anion, and a metal salt, wherein at least one of the cation and the anion includes an ether group.

The cation may include pyrrolidinium, piperidinium, morpholinium, ammonium, phosphonium, or combinations thereof.

Disadvantageously, ionic liquids containing conventionally used cations, (e.g., pyridinium and imidazolium), are inapplicable to lithium secondary batteries due to low reduction stability. Therefore, pyrrolidinium, piperidinium, morpholinium, ammonium, phosphonium, and/or the like having relatively high reduction stability were applied to lithium secondary batteries.

When at least one ether functional group is introduced into imidazolium, the viscosity increases or decreases compared to the case where only an alkyl group is included, but the viscosity increases as the length of the ether functional group increases (Chem. Eur. J. 2002, 8, 3671).

Meanwhile, when at least one ether functional group is introduced into phosphonium, the viscosity decreases compared to the case where only an alkyl group is included, but the viscosity increases as the number of ether functional groups increases (ChemPhysChem 2019, 20, 443).

Specifically, the cation may include:

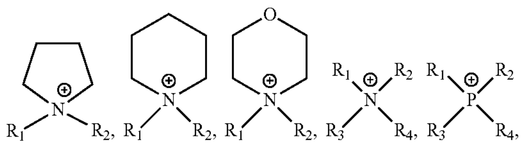

or combinations thereof, wherein $R_1$, $R_2$, $R_3$, and $R_4$ each include a substituted or unsubstituted C1-C12 alkyl group, with the proviso that at least one of $R_1$, $R_2$, $R_3$, and $R_4$ is an aliphatic compound containing an ether functional group. As used herein, the term "substituted" may mean that the functional group is included in the chemical structure of the precursor.

For example, the cation may include:

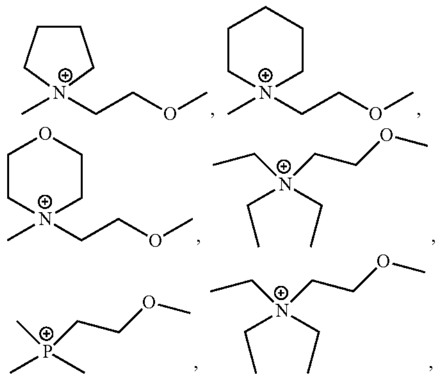

or combinations thereof.

The anion may include an ether functional group represented by:

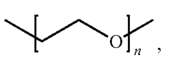

wherein n is an integer in a range of 1 to 3. When n of the ether functional groups is in a range of 1 to 3, the viscosity of the ionic liquid can be reduced and ionic conductivity can be improved even when mixed with a lithium salt.

The anion may include phosphite, phosphate, sulfide, or combinations thereof.

It can be seen that the oxidation stability of the TFSI anion is 5.5 V (vs. Li), whereas the oxidation stability of the phosphite-based anion is very high, in a range of 7 to 9 V (vs. Li) (Adv. Mater. 2016, 28, 9301).

The anion may include:

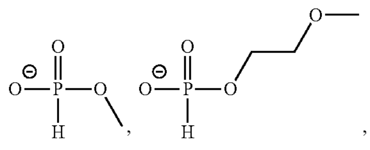

or combinations thereof.

When a long-chain ether functional group is introduced into the anion, phosphite, the viscosity increases as the length of the ether functional group increases. When the anion is mixed with a lithium salt, the viscosity further increases up to 1 equivalent and the ionic conductivity also increases. However, at 1 equivalent or more, the viscosity decreases and the ionic conductivity also decreases. In addition, it is expected that the viscosity of the ionic liquid will be reduced through the introduction of ether functional groups with short chains compared to long chains, and the ionic conductivity will be improved when mixed with lithium salt (Adv. Mater. 2016, 28, 9301).

In addition, the phosphite-based anion into which the ether group is introduced has the effect of improving the lithium transference number. As used herein, the term "transference number" means the contribution of the conductivity of each ion to the total conductivity (J. Phys. Chem. 2019, 123, 20547).

In other words, it can be seen that, when an ether group is introduced into the anion, the selective ionic conductivity of lithium ions increases, which also causes an increase in viscosity. It can be seen that this is due to the introduction of the ether functional group of the anion in addition to the introduction of the ether functional group of the cation.

Figure 2:
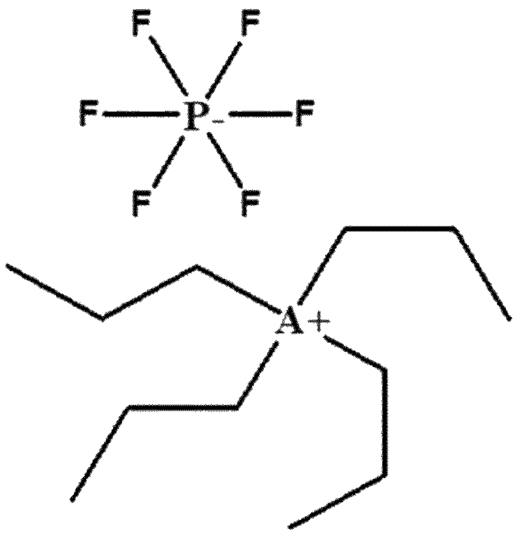
FIG. 2 shows a cation and anion of an ionic liquid of the prior art.
Figure 3:
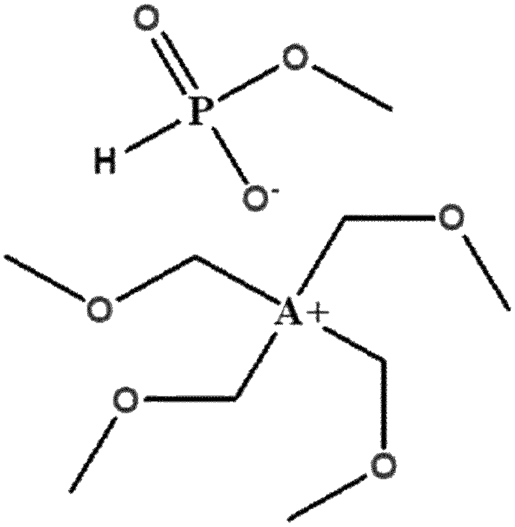
FIG. 3 shows a cation and anion of an ionic liquid according to an embodiment of the present disclosure.

FIG. 2 illustrates the cation and the anion of the ionic liquid of the prior art. FIG. 3 illustrates the cation and anion of the ionic liquid according to an embodiment of the present disclosure. As can be seen from FIGS. 2 and 3, the ionic liquid of the present disclosure may contain 1 to 7 ether functional groups. As the ionic liquid contains more ether functional groups, lithium ion conduction increases and interaction with lithium ions increases, but the molecular weight increases and thus the viscosity increases. When mixed with a lithium salt, the ionic liquid forms a liquid in the form of a solid-like gel and thus the mobility of lithium ions is not high. Therefore, when an ether functional group is applied to the anion as well as the cation, lithium ion conduction can be increased and viscosity can be lowered.

The ionic liquid may be used alone or as a mixture of two or more.

The metal salt may be a salt having the structure of $A^+B^-$, wherein $A^+$ includes at least one alkali metal cation, and wherein $B^-$ includes $BF_4^-$, $B(CN)_4^-$, $CH_3BF_3^-$, $C_2H_5BF_3^-$, $CF_3BF_3^-$, $C_2F_5BF_3^-$, n-$C_3H_7BF_3^-$, n-$C_4F_3BF_3^-$, $PF_6^-$, $CF_3CO_2^-$, $CF_3SO_3^-$, $N(SO_2F)_2^-$, $N(SO_2CF_3)_2^-$, $N(SO_2C_2F_5)_2^-$, $N(COCF_3)(SO_2CF_3)^-$, $N(CN)_2^-$, $C(CN)_3^-$, $SCN^-$, $SeCN^-$, $CuCl_2^-$, $AlCl_4^-$, $F(HF)_{2.3}^-$, $BOB^-$, $ODFB^-$, or combinations thereof.

A molar ratio of the ionic liquid to the metal salt may be in a range of 0.1:1 to 1:1. At this time, when the molar ratio is not within the above range, problems in that lithium dissolution may be reduced upon application to the battery and the electrolyte is solidified at room temperature may occur.

The lowest unoccupied molecular orbital (LUMO) energy of the electrolyte may be higher than the lowest unoccupied molecular orbital (LUMO) energy level of lithium.

The LUMO energy level of most ionic liquids is lower than or overlaps with that of lithium, so that the ionic liquid is reduced and decomposed during continuous chemical decomposition and charging and discharging when the ionic liquid comes into contact with the lithium metal. For this reason, a resistive organic film that limits the movement of lithium ions may be formed to cause deterioration or degradation of the battery performance. Therefore, it is essential to use an additive that is decomposed earlier than the ionic liquid to protect the lithium metal. However, the effect may be limited when the additive is used because the viscosity of the electrolyte is further increased.

Because most of cations of ionic liquids are large organic compounds, it is difficult to use the cations of the ionic liquids as an additive. Therefore, when a phosphite anion capable of forming a high ionic conductivity film on a lithium metal is prepared as an additive and added to an ionic liquid, the function of protecting the lithium metal, which is a function of the additive, can be expected. The phosphite-based anion forms a flexible resistive film such as $(PO_4)^{3-}$, Li—P, or the like on lithium metal and lithium secondary battery cathodes, thus causing rapid ion conduction, uniform electrodeposition of lithium on the surface of the lithium electrode, suppressing the elution of nickel on the cathode and realizing a lithium secondary battery having a long lifespan.

However, the amount of anion used as an additive is only in a range of 0.1 wt % to 3 wt % based on 100 wt % of the total weight of the ionic liquid. As such, the effects thereof on physical properties such as ionic conductivity and viscosity of the electrolyte are small.

That is, general additives are all consumed during initial film formation and then deterioration is caused by the deteriorated film during continuous charging and discharging. On the other hand, in the present disclosure, because a phosphite-based anion is used as an additive, the ionic liquid is used as a solvent in excess and has a self-healing function that can reinforce the deteriorated film. Therefore, in the present disclosure, the effect of the additive can be obtained without increasing the viscosity using a phosphite anion as an additive.

The electrolyte may be in a liquid state at a temperature in a range of 15° C. to 25° C. when the molecular weight thereof is 350 g/mol or less, (e.g., 190 g/mol to 350 g/mol). Because the ionic liquid of the present disclosure may be in a liquid state at a temperature in a range of 15° C. to 25° C., the liquid phase can be maintained, and the mobility of lithium ions can be improved even when mixed with a lithium salt.

Hereinafter, the present disclosure is described in more detail with reference to the following examples and comparative examples. However, these examples should not be construed as limiting the scope of the present disclosure.

Example 1 and Comparative Examples 1 to 3

Electrolytes for lithium secondary batteries were prepared in accordance with the composition shown in Table 1 below.

TABLE 1

| | Cations | Anions |
|---|---|---|
| Example 1 | Pyrrolidinium, piperidinium, morpholinium, ammonium and phosphonium cations including ether functional group | Phosphite, phosphate and sulfide anions including ether functional group |
| Comparative Example 1 | Pyrrolidinium, piperidinium, morpholinium, ammonium and phosphonium cations including ether functional group | Anions including no ether functional group |
| Comparative Example 2 | Pyridinium and imidazolium cations, not related to the presence of ether functional group | Phosphite, phosphate and sulfide anions including no ether functional group |
| Comparative Example 3 | Cations not related to the presence of ether functional group | Phosphite, phosphate and sulfide anions including ether functional group (molecular weight of 350 g/mol or more) |

Experimental Example 1: Comparison of Physical Properties of Examples and Comparative Examples A physical property comparison experiment was performed using the electrolytes for lithium secondary batteries prepared in Example 1 and Comparative Examples 1 to 3. The results are shown in Table 2 below.

TABLE 2

| | Lithium metal stability | Lithium ion conductivity | Viscosity |
|---|---|---|---|
| Example 1 | Excellent | Up to 7 lithium ion conductive functional groups (ether groups) | Liquid at room temperature (15-25° C.) |

TABLE 2-continued

| | Lithium metal stability | Lithium ion conductivity | Viscosity |
|---|---|---|---|
| Comparative Example 1 | Excellent | Up to 4 lithium ion conductive functional groups (ether groups) | Liquid at molecular weight of 350 g/mol or less |
| Comparative Example 2 | Very low | Up to 7 lithium ion conductive functional groups (ether groups) | Liquid at molecular weight of 350 g/mol or less |
| Comparative Example 3 | Very high | Up to 7 lithium ion conductive functional groups (ether groups), but inactivated due to high viscosity | Solid at room temperature (15-25° C.) |

It can be seen from Table 2 that Examples according to the present disclosure have excellent lithium metal stability, have a maximum of 7 lithium ion conductive functional groups, and are liquids at room temperature, and thus have excellent lithium ion conductivity.

On the other hand, in Comparative Example 1 in which the anion does not contain an ether functional group, the ether functional group is introduced only into the cation, so up to four functional groups can be introduced depending on the type of cation. Therefore, Comparative Example 1 has a disadvantage in that lithium movement is limited due to the high viscosity compared to a general organic electrolyte because the number of lithium ion conductive functional groups that can be introduced is only 57% compared to Example.

In Comparative Example 2, the LUMO energy level of the electrolyte is lower than that of lithium metal, lithium metal stability is very low and thus driving is impossible in the battery using lithium as an electrode.

Comparative Example 3 including an anion having a very high molecular weight may have a high viscosity because the molecular weight of the electrolyte is high, so even if it contains an excessive amount of lithium ions, the physical mobility for conducting lithium ions is disadvantageously very low.

Experimental Example 2: Comparison of Effects of Introduction of Ether Functional Groups into Cations An experiment was conducted to compare the effects of introducing an ether functional group into cations. The results are shown in Tables 3 and 4.

TABLE 3

| Anion ($FSI^-$) Coupled | 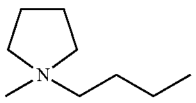 | 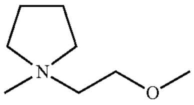 |
|---|---|---|
| Name | [Pyr14] | [Pyr12O1] |
| Molecular weight (g/mol) | 322.39 | 324.37 |
| Viscosity (cP) | 37.71 | 22.38 |

TABLE 4

| Anion (FSI−) coupled | 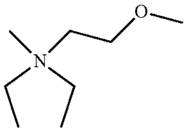 | 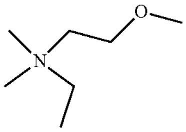 | 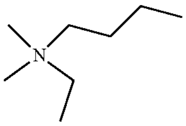 |
|---|---|---|---|
| Name | [N122,2O1] | [N112,2O1] | [N1114] |
| Molecular weight (g/mol) | 326.28 | 312.35 | 296.36 |
| Viscosity (cP) | 27.75 | 23.30 | 34.80 |

It can be seen from Tables 3 and 4 that [N122,2O1] and [N112,2O1], having a difference in $CH_2$ (~14 g/mol), have a viscosity difference of 4.5 cP. That is, as the molecular weight increases, the viscosity increases.

However, when [Pyr14] is compared with [Pyr12O1], and [N112,2O1] is compared with [N1114], [Pyr12O1] and [N1114] have high molecular weights but contain an ether functional group and thus have decreased viscosity. Therefore, it can be seen that, when an ether functional group is introduced into cations, there is a significant functional group effect in viscosity compared to the molecular weight reduction effect.

Therefore, the electrolyte for secondary batteries according to the present disclosure includes an ionic liquid containing an ether functional group, so the effects of lowering the viscosity and improving lithium ion conduction can be obtained even when the molecular weight is increased.

As is apparent from the foregoing, the electrolyte for lithium secondary batteries according to the present disclosure can minimize an increase in viscosity and improve lithium ion conduction.

The effects of the present disclosure are not limited to those mentioned above. It should be understood that the effects of the present disclosure include all effects that can be inferred from the description of the present disclosure.

Although the present disclosure has been described in detail with reference to embodiments thereof, it will be appreciated by those skilled in the art that changes may be made in these embodiments without departing from the principles and spirit of the present disclosure, the scope of which is defined in the appended claims and their equivalents.

What is claimed is:

1. An electrolyte for a lithium secondary battery, the electrolyte comprising:

an ionic liquid comprising a cation and an anion; and a metal salt, wherein the cation and the anion each comprises an ether group, and wherein the ionic liquid comprises up to 7 ether groups.

2. The electrolyte of claim 1, wherein the cation comprises pyrrolidinium, piperidinium, morpholinium, ammonium, phosphonium, or combinations thereof.

3. The electrolyte of claim 1, wherein the cation comprises:

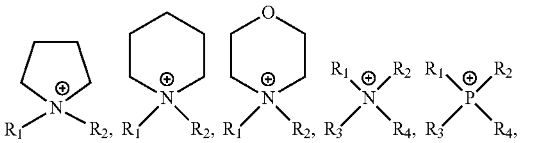

or combinations thereof, wherein $R_1$, $R_2$, $R_3$, and $R_4$ each comprise a substituted or unsubstituted C1-C12 alkyl group, and wherein at least one of $R_1$, $R_2$, $R_3$, and $R_4$ comprises an aliphatic compound comprising the ether group.

4. The electrolyte of claim 1, wherein the cation comprises:

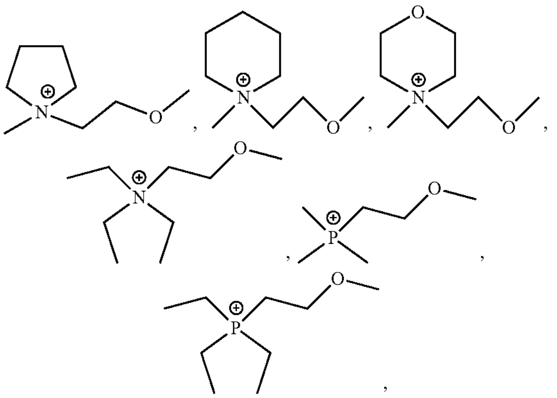

or combinations thereof.

5. The electrolyte of claim 1, wherein the anion comprises the ether group represented by:

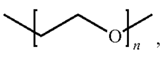

wherein n is an integer in a range of 1 to 3.

6. The electrolyte of claim 1, wherein the anion comprises phosphite, phosphate, sulfide, or combinations thereof.

7. The electrolyte of claim 1, wherein the anion comprises:

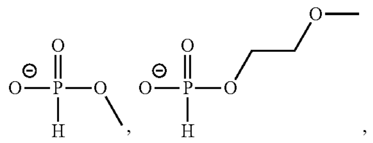

or combinations thereof.

8. The electrolyte of claim 1, wherein the metal salt comprises a salt having a structure of $A^+B^-$, wherein $A^+$ comprises at least one alkali metal cation, and wherein $B^-$ comprises $BF_4^-$, $B(CN)_4^-$, $CH_3BF_3^-$, $C_2H_5BF_3^-$, $CF_3BF_3^-$, $C_2F_5BF_3^-$, n-$C_3H_7BF_3^-$, n-$C_4F_9BF_3^-$, $PF_6^-$, $CF_3CO_2^-$, $CF_3SO_3^-$, $N(SO_2F)_2^-$, $N(SO_2CF_3)_2^-$, $N(SO_2C_2F_5)_2^-$, $N(COCF_3)(SO_2CF_3)^-$, $N(CN)_2^-$, $C(CN)_3^-$, $SCN^-$, $SeCN^-$, $CuCl_2^-$, $AlCl_4^-$, $F(HF)_{2.3}^-$, $BOB^-$, $ODFB^-$, or combinations thereof.

9. The electrolyte of claim 1, wherein a molar ratio of the ionic liquid to the metal salt is in a range of 0.1:1 to 1:1.

10. The electrolyte of claim 1, wherein a lowest unoccupied molecular orbital (LUMO) energy of the electrolyte is higher than a lowest unoccupied molecular orbital (LUMO) energy level of lithium.

11. The electrolyte of claim 1, wherein the electrolyte is a liquid state in a range of 15° C. to 25° C. when the electrolyte has a molecular weight of 350 g/mol or less.

12. A lithium secondary battery comprising:

a cathode;

an anode comprising a lithium metal; and a separator interposed between the cathode and the anode, wherein the lithium secondary battery is impregnated with an electrolyte comprising:

an ionic liquid comprising a cation and an anion; and a metal salt, wherein at least one of the cation and the anion each comprises an ether group, and wherein the ionic liquid comprises up to 7 ether groups.

13. The lithium secondary battery of claim 12, wherein the cation of the electrolyte comprises pyrrolidinium, piperidinium, morpholinium, ammonium, phosphonium, or combinations thereof.

14. The lithium secondary battery of claim 12, wherein the cation of the electrolyte comprises:

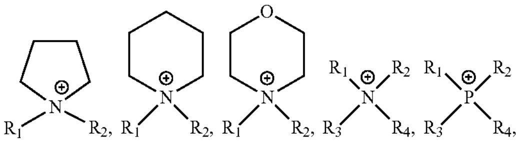

or combinations thereof, wherein $R_1$, $R_2$, $R_3$, and $R_4$ each comprise a substituted or unsubstituted C1-C12 alkyl group, and wherein at least one of $R_1$, $R_2$, $R_3$, and $R_4$ comprises an aliphatic compound comprising the ether group.

15. The lithium secondary battery of claim 12, wherein the cation of the electrolyte comprises:

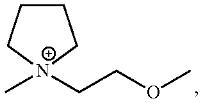,
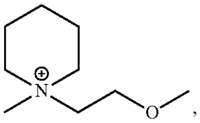,
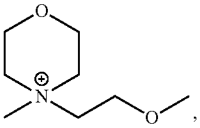,
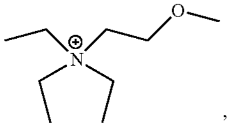,
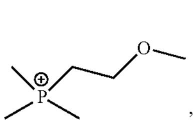,
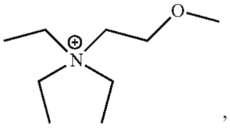, or combinations thereof.

16. The lithium secondary battery of claim 12, wherein the anion of the electrolyte comprises the ether group represented by:

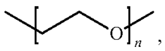, wherein n is an integer in a range of 1 to 3.

17. The lithium secondary battery of claim 12, wherein the anion of the electrolyte comprises phosphite, phosphate, sulfide, or combinations thereof.

18. The lithium secondary battery of claim 12, wherein the anion of the electrolyte comprises:

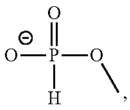,
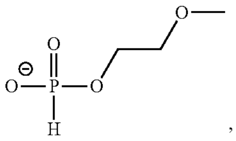, or combinations thereof.

19. The lithium secondary battery of claim 12, wherein the metal salt of the electrolyte comprises a salt having a structure of $A^+B^-$, wherein $A^+$ comprises at least one alkali metal cation, and wherein $B^-$ comprises $BF_4^-$, $B(CN)_4^-$, $CH_3BF_3^-$, $C_2H_5BF_3^-$, $CF_3BF_3^-$, $C_2F_5BF_3^-$, n-$C_3H_7BF_3^-$, n-$C_4F_9BF_3^-$, $PF_6^-$, $CF_3CO_2^-$, $CF_3SO_3^-$, $N(SO_2F)_2^-$, $N(SO_2CF_3)_2^-$, $N(SO_2C_2F_5)_2^-$, $N(COCF_3)(SO_2CF_3)^-$, $N(CN)_2^-$, $C(CN)_3^-$, $SCN^-$, $SeCN^-$, $CuCl_2^-$, $AlCl_4^-$, $F(HF)_{2.3}^-$, $BOB^-$, $ODFB^-$, or combinations thereof.

* * * * *